United States Patent
Uchiyama et al.

[11] Patent Number: 5,384,706
[45] Date of Patent: Jan. 24, 1995

[54] SUSPENSION SYSTEM FOR VEHICLE

[75] Inventors: Masaaki Uchiyama; Kenichi Nakamura, both of Kanagawa; Takashi Nezu, Tokyo; Hidekatsu Ozaki, Kanagawa, all of Japan

[73] Assignee: Tokico Ltd., Kanagawa, Japan

[21] Appl. No.: 138,387

[22] Filed: Oct. 20, 1993

Related U.S. Application Data

[63] Continuation of Ser. No. 801,665, Dec. 2, 1991, abandoned.

[30] Foreign Application Priority Data

Feb. 20, 1991 [JP] Japan ................. 3-026551
Nov. 30, 1991 [JP] Japan ................. 2-334089

[51] Int. Cl.⁶ .............................................. B60G 17/00
[52] U.S. Cl. .......................... 364/424.05; 280/707; 280/840
[58] Field of Search ............ 364/424.05; 280/707, 280/840

[56] References Cited

U.S. PATENT DOCUMENTS

| | | | |
|---|---|---|---|
| 4,368,900 | 1/1983 | Beusse | 280/707 |
| 4,747,615 | 5/1988 | Yamamoto | 280/707 |
| 4,756,549 | 7/1988 | Kurosawa et al. | 280/707 |
| 4,825,370 | 4/1989 | Kurosawa | 280/707 |
| 4,934,732 | 6/1990 | Fukunaga et al. | 280/707 |
| 5,142,475 | 8/1992 | Matsunaga et al. | 280/840 |
| 5,168,448 | 12/1992 | Matsumoto et al. | 280/707 |

Primary Examiner—Gary Chin
Attorney, Agent, or Firm—Wenderoth, Lind & Ponack

[57] ABSTRACT

A suspension system for a vehicle which has a hydraulic cylinder that extends and retracts in accordance with a change in the distance between a vehicle body and an axle to vary the volumetric capacity of a working chamber defined therein, an accumulator connected to the working chamber in the hydraulic cylinder, a control valve controlling the flow rate of oil charged into and discharged from the accumulator and the hydraulic cylinder, and a vehicle level sensor detecting a change in the above-described distance. The suspension system further has a control unit that controls the control valve, on the basis of a flow control signal obtained by multiplying the detected signal from the vehicle level sensor by an amplification factor, so as to restore the vehicle to a neutral state. The control unit is arranged to increase the amplification factor when the amount of the extension or retraction of the hydraulic cylinder is close to the extent of the full stroke thereof. When the vehicle is running on a normal road surface, the suspension system absorbs any changes in the road surface, thereby stably maintaining the attitude of the vehicle body, and in the case of large irregularities, it is possible to prevent full rebound or full bump which would otherwise occur when the hydraulic cylinder performs a full-stroke operation.

3 Claims, 16 Drawing Sheets

SUSPENSION SYSTEM FOR VEHICLE

This application is a continuation of now abandoned application, Ser. No. 07/801,665, filed Dec. 2, 1991.

BACKGROUND OF THE INVENTION

1. Field of the Invention

The present invention relates to a suspension system for a vehicle which has a hydraulic cylinder provided between a vehicle body and an axle. More particularly, the present invention relates to a suspension system which is designed so that when the vehicle is running on a normal road surface, the suspension system absorbs any changes in the road surface, thereby stably maintaining the attitude of the vehicle body, and in the case of large irregularities, it is possible to prevent full rebound or full bump which would otherwise occur when the hydraulic cylinder performs a full-stroke operation.

2. Description of the Prior Art

There has heretofore been a conventional suspension system for a vehicle, known as an active control type suspension system, wherein a hydraulic cylinder is provided between a vehicle body and an axle, and the level of pressure generated in the hydraulic cylinder is controlled in accordance with a value obtained by multiplying a detected vertical speed of the vehicle body by a negative constant, thereby preventing vibration of the vehicle body.

The conventional suspension system is arranged to calculate a vertical speed of a portion of the vehicle body at the position of each wheel by integrating the output value from an acceleration sensor provided for each wheel. For this reason, the prior art suffers from the problem that much time is needed for the integral calculation and hence the response is slow and that, since errors in the acceleration sensors are enlarged by the integration, a slight error in the acceleration sensors makes it impossible to obtain satisfactory vibration-damping characteristics.

The present applicant has proposed a suspension system (Japanese Patent Application No. 01-100590 (1989)) which is free from the above-described problems.

More specifically, the proposed suspension system comprises a hydraulic cylinder that extends and retracts in accordance with a change in the distance between a vehicle body and an axle to vary the volumetric capacity of a working chamber defined therein, an accumulator connected to the working chamber in the hydraulic cylinder and containing a gas and an oil which is capable of flowing in and out of the accumulator, a flow control valve controlling the flow rate of oil charged into and discharged from the accumulator and the hydraulic cylinder, a vehicle level sensor detecting the distance between the vehicle body and the axle, an acceleration sensor detecting the vertical acceleration of the vehicle body, and a control unit controlling the flow control valve on the basis of a first flow control signal obtained by multiplying the detected signal from the vehicle level sensor by a first amplification factor and a second flow control signal obtained by multiplying the detected signal from the acceleration sensor by a second amplification factor.

The above-described suspension system has excellent vibration-damping characteristics and also exhibits high response because it does not involve the execution of an integral calculation such as that described above. However, since the first amplification factor must be set to a small value in order to absorb not only steep changes of the road surface but also gradual changes thereof to thereby stabilize the attitude of the vehicle body, even if the hydraulic cylinder is near the end of its stroke, the controlled variable is small, whereby full rebound or full bump is likely to occur.

It should be noted here that "full rebound" describes a state where a vehicle body rebounds in response to an impact to which it is subjected when the hydraulic cylinder extends as far as the end of its extension stroke, while "full bump" refers to a piston impacting against the cylinder end when the hydraulic cylinder retracts as far as the end of its retraction stroke.

SUMMARY OF THE INVENTION

In view of the above-described problems of the prior art, it is an object of the present invention to provide a suspension system which is designed so that, when the vehicle is running on a normal road surface, the suspension system absorbs any changes in the road surface, thereby stably maintaining the attitude in the vehicle body, and in the case of large irregularities, it is possible to prevent full rebound or full bump which would otherwise occur when the hydraulic cylinder performs a full-stroke operation.

To this end, the present invention provides a suspension system for a vehicle which comprises a hydraulic cylinder that extends and retracts in accordance with a change in the distance between a vehicle body and an axle to vary the volumetric capacity of a working chamber defined therein, an accumulator connected to the working chamber in the hydraulic cylinder and containing a gas and oil which is capable of flowing in and out of the accumulator, a flow control valve controlling the flow rate of oil charged into and discharged from the accumulator and the hydraulic cylinder, a vehicle level sensor detecting a change in the above-described distance, and a control unit controlling the flow control valve on the basis of a flow control signal obtained by multiplying the detected signal from the vehicle level sensor by an amplification factor so as to respond to a change in the distance by restoring the vehicle level to a neutral state, the control unit being arranged to increase the amplification factor when the above-described detected signal is indicative of the cylinder being close to an end of the full stroke thereof.

According to this suspension system, when the vehicle level changes to such an extent that the hydraulic cylinder is at as a position close to an end of its stroke, the amplification factor is increased in the control unit, resulting in a rapid increase in the force derived from the hydraulic cylinder to respond to the change in the vehicle level by restoring it to a neutral position, thus making it possible to almost completely prevent the occurrence of full rebound or full bump, which would otherwise occur when the hydraulic cylinder performs a full-stroke operation.

Since the amplification factor is increased only in a range where the hydraulic cylinder is in a position close to an end of the stroke, when the vehicle is running on a road surface in a normal state, the operation of restoring the vehicle level to the neutral position is effected gradually, so that there is no probability that changes in the road surface will be transmitted directly to the vehicle body to make the attitude thereof unstable.

In one embodiment of the present invention, the suspension system is arranged such that the control unit increases the amplification factor when the above-described detected signal is indicative of the hydraulic cylinder being close to the extent of the full stroke thereof and the extension or retraction is progressing toward the stroke end.

In the suspension system of this embodiment, when the change of the vehicle level is not progressing toward a stroke end of the hydraulic cylinder (i.e., in such a case, there is no possibility of the hydraulic cylinder operating as far as the stroke end), the amplification factor is not increased even if the vehicle level Is In the range where the hydraulic cylinder operates in a position close to the stroke end. Accordingly, it is possible not only to prevent full rebound or full bump but also to maintain the attitude of the vehicle body stably over a wider range.

In one embodiment of present invention, the the control unit increases the amplification factor in accordance with the operating speed of the hydraulic cylinder that is obtained on the basis of the above-described detected signal when the detected signal is indicative of the hydraulic cylinder being close to the extent of the full stroke thereof and the extension or retraction is progressing toward the stroke end.

In the suspension system of this embodiment, when a change in the vehicle level is such that the hydraulic cylinder is progressing toward an end of its stroke, the vehicle level is controlled to restore it to the neutral position with a controlled variable which is proportional to the speed of the change of the vehicle level.

Thus, even if the vehicle body speed is high, full rebound or full bump can be prevented, and when there is a large change of the road surface, there is no variation in the controlled variable due to inversion of the sign of the vehicle body speed, so that rebound or the like can be prevented. Accordingly, the suspension system can prevent full rebound or the like even more reliably, and yet there is no probability of the vehicle body becoming unstable due to the preventive operation.

In addition, the present invention provides a suspension system for a vehicle which comprises a hydraulic cylinder that extends and retracts in accordance with a change in the distance between a vehicle body and an axle to vary the volumetric capacity of a working chamber defined therein, an accumulator connected to the working chamber in the hydraulic cylinder and containing a gas and oil which is capable of flowing in and out of the accumulator, a flow control valve controlling the flow rate of oil charged into and discharged from the accumulator and the hydraulic cylinder, a vehicle level sensor detecting a change in the above-described distance, and a control unit controlling the flow control valve on the basis of a flow signal obtained by summing together a vehicle level control variable, obtained by multiplying the detected value from the vehicle level sensor by a vehicle level control amplification factor which increases in accordance with the increase in the detected value, and a speed control variable, obtained by multiplying the detected value from the vehicle level sensor by a speed control amplification factor after the detected value has been differentiated, thereby restoring the vehicle to a neutral state and further reducing the relative velocity between the vehicle body and the axle, the control unit further controlling the flow control valve such that, when the detected value from the vehicle level sensor is within a predetermined range including a value representative of the neutral state of the vehicle, the control unit sets the speed control amplification factor to a value not larger than a predetermined value, whereas, when the detected value from the vehicle level sensor is out of the predetermined range, the control unit sets the speed control amplification factor to a value larger than the predetermined value.

According to the suspension system of the present invention, described above, when the vehicle level changes to such an extent that the hydraulic cylinder operates as far as a position close to a stroke end, the control unit increases the vehicle level control amplification factor and sets the speed control amplification factor to a value larger than a predetermined value, resulting in a rapid increase of the flow signal. Accordingly, the force derived from the hydraulic cylinder to restore the vehicle level to the neutral position increases rapidly, thus making it possible to prevent the occurrence of full rebound or full bump, which would otherwise occur when the hydraulic cylinder performs a full-stroke operation. In other words, the suspension system of the present invention feedback-controls the distance between the vehicle body and the axle such that, the greater the deviation of the distance from the neutral state, the greater the force that is produced to restore it to the neutral state, and it also reduces the relative velocity between the vehicle body and the axle (i.e., increases the suspension damping coefficients) by feedback control. Thus, full rebound or the like can be prevented extremely effectively and reliably.

Moreover, when the distance between the vehicle body and the axle is such that the vehicle is in the vicinity of the neutral state (i.e., during running on a normal road surface), the speed control amplification factor is set to a value not larger than a predetermined value, so that the controlled variable of the feedback control decreases or no feedback control is effected, and the vehicle level control amplification factor is increased only in a range where the hydraulic cylinder operates as far as a position close to a stroke end. Thus, despite the existence of speed feedback which can make a vehicle uncomfortable to ride in, it is possible to ensure a good vehicle ride when running on a normal road surface by maintaining the suspension damping coefficient at a low level and thereby gradually restoring the vehicle level to a neutral position.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements.

FIGS. 1 to 8 and 12 are views illustrating one embodiment of the suspension system according to the present invention, in which: FIG. 1 is a schematic diagram of the suspension system; FIG. 2 is a block diagram of a control unit shown in FIG. 1; FIG. 3 is a graph showing the relationship between the vehicle level and a controlled variable; and FIG. 12 is a block diagram showing the flow of signals throughout the suspension system.

FIGS. 4 to 6 are views illustrating a second embodiment of the suspension system according to the present invention, in which: FIG. 4 is a block diagram of a control unit of the second embodiment; FIG. 5 is a graph showing the relationship between the vehicle level and an amplification factor; and FIG. 6 is a graph showing the relationship between the vehicle level and a controlled variable.

FIGS. 7 to 10 are views illustrating a third embodiment of the suspension system according to the present invention, in which: FIG. 7 is a flowchart showing the operation of a control unit in the third embodiment; FIG. 8 is a graph showing the relationship between the vehicle level and an amplification factor; FIG. 9 is a graph showing the relationship between the vehicle level and the stroke of a hydraulic cylinder.

DETAILED DESCRIPTION OF THE PREFERRED EMBODIMENT

A first embodiment of the present invention will be described below with reference to FIGS. 1 to 3 and 12.

Figure 1:
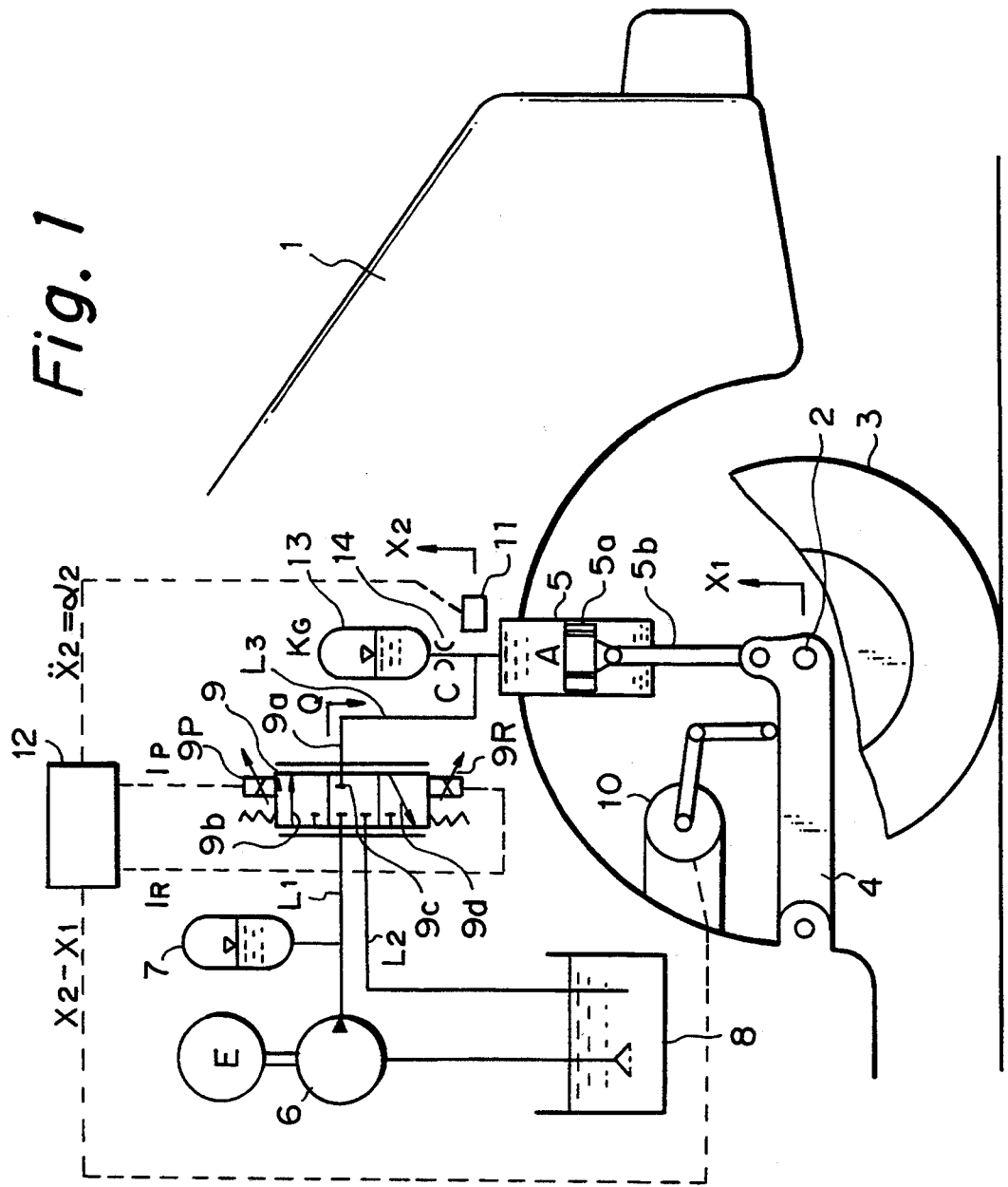

FIG. 1 is a schematic diagram showing the general arrangement of the first embodiment of the suspension system for a vehicle according to the present invention. In this figure, reference numeral 1 denotes a vehicle body (mass m), 2 an axle, 3 a tire, and 4 an arm that is pivotally supported at one end thereof by the vehicle body 1 and at the other end by the axle 2. The vehicle body 1, the axle 2, the tire 3, and the arm 4 each constitute a part of a vehicle.

The suspension system mounted on the vehicle shown in FIG. 1 is arranged as follows. A hydraulic cylinder 5 (with a pressure-receiving area A) is provided on the axle 2 to support the vehicle body 1. The hydraulic cylinder 5 extends and retracts in accordance with the relative vertical displacement $(X_2-X_1)$ between the vehicle body 1 and the axle 2 (the displacement being hereinafter referred to as "vehicle level"), so that oil flows in and out of the cylinder 5 through piping L3 in accordance with the extension and retraction of the hydraulic cylinder 5.

In the figure, $X_1$ and $X_2$ represent respective displacements of the axle 2 and the vehicle body 1 from a reference point in the vertical direction. The hydraulic cylinder 5 has a piston 5a fitted therein to define oil chambers on both sides thereof, which are communicate with each other through a through-hole that is formed in the piston 5a. The pressure-receiving area A of the hydraulic cylinder 5 is equal to the cross-sectional area of a rod 5b that is connected to the piston 5a.

Reference numeral 6 denotes a hydraulic pump having an engine E as a drive source, 7 an accumulator containing a gas to function as a gas spring, and 8 a reservoir tank for storing oil. The hydraulic pump 6, the accumulator 7 and the reservoir tank 8 constitute in combination a hydraulic system (hydraulic power source).

A flow control valve 9 controls the flow rate of oil charged into and discharged from the hydraulic cylinder 5. The flow control valve 9 is connected to the hydraulic pump through piping L1, to the reservoir tank 8 through piping L2, and to the hydraulic cylinder 5 through the piping L3.

In addition, an accumulator (spring constant $K_G$) 13 containing a gas is provided at an intermediate point in the piping L3 connecting the hydraulic cylinder 5 and the flow control valve 9. Further, a restrictor 14 with a damping coefficient C is provided inbetween the intermediate point in the piping L3 and and the accumulator 13. The restrictor 14 functions to offer piping resistance for suppressing free oscillation when the flow control valve 9 ceases operation. Reference numeral 10 denotes a vehicle level sensor that detects a vehicle level $(X_2-X_1)$, 11 an acceleration sensor that detects an acceleration $\alpha_2$ in the vertical direction of the vehicle body 1, and 12 a control unit that is supplied with a vehicle level signal $(X_2-X_1)$ from the vehicle level sensor 10 and an acceleration signal $\alpha_2$ from the acceleration sensor 11 to control on the basis of these signals the amount of movement of each of the oil charge- and discharge-side solenoids 9P and 9R of the flow control valve 9 (described later), that is, the charge-discharge quantity.

The flow control valve 9 will next be described in detail. The flow control valve 9 comprises two solenoids (oil charge-side solenoid 9P and oil discharge-side solenoid 9R), an input-output port 9a, and three ports, that is, an oil charge port 9b, a hold port 9c, and an oil discharge port 9d, which are selectively connected to the input-output port 9a by the switching operation of the solenoids 9P and 9R. The input-output port 9a is connected to the piping L3.

The arrangement is such that, if a current $I_P$ is supplied to the oil charge-side solenoid 9P from the control unit 12, the oil charge port 9b and the input-output port 9a are placed in communication with each other, and the hydraulic pump 6 is activated to charge oil into the hydraulic cylinder 5 and the accumulator 13 from the reservoir tank 8, so that pressure is generated in the hydraulic cylinder 5. On the other hand, if a current $I_R$ is supplied to the oil discharge-side solenoid 9R from the control unit 12, the oil discharge port 9d and the input-output port 9a are placed in communication with each other, so that the oil is discharged from the hydraulic cylinder 5 and the accumulator 13 to the reservoir tank 8, resulting in a reduction in the pressure. It should be noted that when the control unit 12 supplies no current to the oil charge-side solenoid 9P and the oil discharge-side solenoid 9R, the hold port 9c and the input-output port 9a are placed in communication with each other, thereby suspending the charge-discharge operation, and thus maintaining the pressure of oil inside the hydraulic cylinder 5. The flow control valve 9 is arranged such that the charge-discharge quantity Q increases unvaryingly according to predetermined functional conditions, as shown in a block denoted by reference symbol B9 in FIG. 2.

Next, the arrangement and function of the control unit 12 will be explained with reference to FIG. 2.

Figure 2:
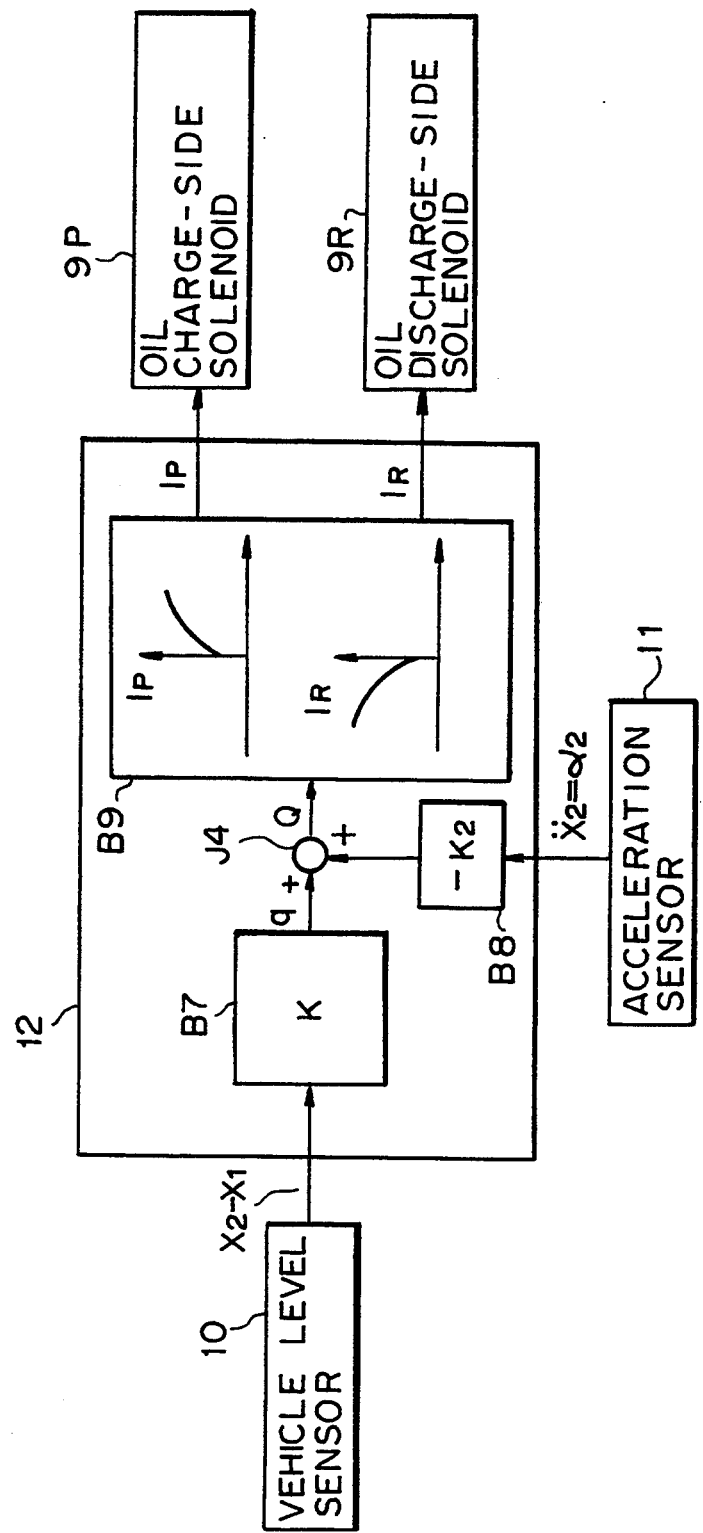

Referring to FIG. 2, which is a block diagram showing the arrangement and function of the control unit 12, the vehicle level sensor 10 detects a vehicle level $(X_2-X_1)$ and supplies a vehicle level signal $(X_2-X_1)$ to the control unit 12. Similarly, the acceleration sensor 11 detects an acceleration $\alpha_2$ and supplies an acceleration signal $\alpha_2$ to the control unit 12.

When the control unit 12 is supplied with the vehicle level signal $(X_2-X_1)$ and the acceleration signal $\alpha_2$, the vehicle level signal $(X_2-X_1)$ is multiplied by an amplification factor K (detailed later) in an amplifier element B7 to output a flow signal q $(q=K\cdot((X_2-X_1))$. In addition, the acceleration signal $\alpha_2$ is multiplied by a constant amplification factor $-K_2$ in an amplifier element B8 to output a signal $-K_2\cdot\alpha_2$. The outputs from the amplifier elements B7 and B8 are summed together at a summing point J4 to obtain a flow signal Q $(Q=K\cdot((X_2-X_1)-K_2\cdot\alpha_2)$, which is then input to a transfer element B9. In the transfer element B9, inverse transformation of flow control valve characteristics is executed so that the flow rate controlled by the flow control valve 9 coincides with the value of the flow signal Q, and the control unit 12 supplies a current to either the oil charge-side solenoid 9P or the oil discharge-side solenoid 9R. More specifically, when the flow signal Q is positive, the control unit 12 supplies the current $I_P$ corresponding to the flow rate Q to the oil charge-side solenoid 9P, whereas, when the flow signal Q is negative, the control unit 12 supplies the current $I_R$ corresponding to the flow rate Q to the oil discharge-side solenoid 9R.

Figure 3:
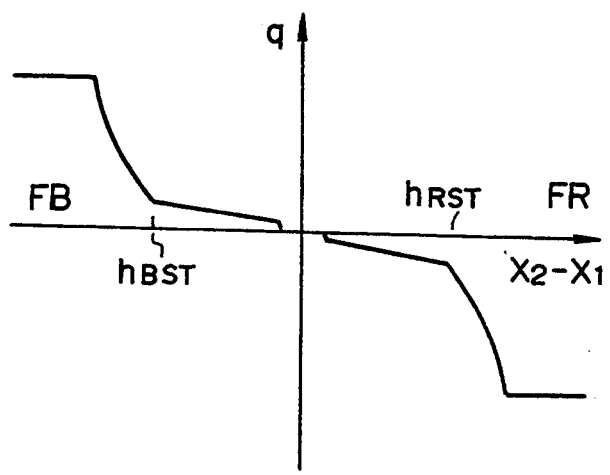

As shown in FIG. 3, the amplification factor K is set for each range as follows (1) In the case of $h_{BST} < X_2-X_1 < h_{RST}$.
   (exclusive of $X_2-X_1=0$)

This condition applies in a case where the vehicle is running on a normal road surface, that is, the vehicle level $(X_2-X_1)$ is somewhere between a normal maximum level $h_{RST}$ at which the hydraulic cylinder 5 extends as far as a position a little short of the end of the full extension stroke and a normal minimum level $h_{BST}$ at which the hydraulic cylinder 5 retracts as far as a position a little short of the of the full retraction stroke. In this case, K is set to a predetermined value $-k_1$, which is minimized to such an extent that it will not interfere with the function of the suspension system to restore the vehicle level to a neutral position (i.e., a position where $X_2-X_1=0$)

(ii) In the case of $X_2-X_1 \geq h_{RST}$.

This condition applies in a case where the hydraulic cylinder 5 beyond the position corresponding to the normal maximum level $h_{RST}$. In such a case, K is set, for example, to $K=-k_1\cdot(X_2-X_1)/h_{RST}$, so that the flow signal q (controlled variable) lowers in a higher-order functional manner in accordance with the increase in the vehicle level $(X_2-X_1)$.

(iii) In the case of $X_2-X_1 \leq h_{BST}$.

This condition applies in a case where the hydraulic cylinder 5 retracts beyond the position corresponding to the normal minimum level $h_{BST}$. In such a case, K is set, for example, to $K=k_1\cdot(X_2-X_1)/h_{BST}$, so that the flow signal q rises in a higher-order functional manner in accordance with the decrease in the vehicle level $(X_2-X_1)$.

Figure 12:
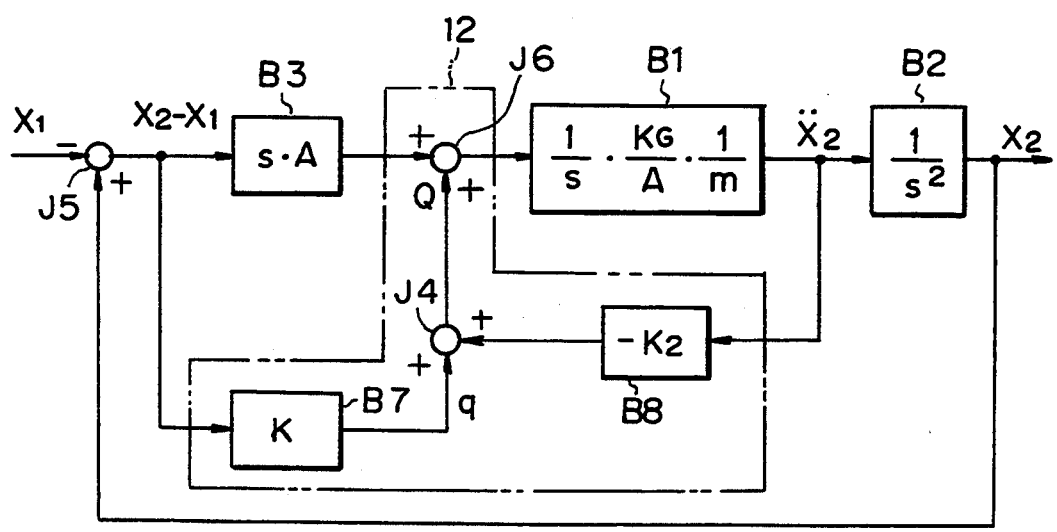

According to the suspension system, arranged as described above, the transfer characteristic of the displacement $X_2$ of the vehicle body with respect to the displacement $X_1$ of the axle is such as that shown in the block diagram of FIG. 12. It should be noted that symbol s in the block diagram represents a Laplace operator.

More specifically, in FIG. 12, a summing point J5 shows that the difference between the displacement $X_1$ of the axle and the displacement $X_2$ of the vehicle body is output as a change in the vehicle level. The displacement $(X_2-X_1)$ is equivalent to the amount of movement of the piston 5a in the hydraulic cylinder 5. An element B3 shows that a rate of flow of oil between the hydraulic cylinder 5 and the accumulator 13 is generated in accordance with the amount of movement of the piston 5a. In other words, a rate of flow of oil is generated which has a value that is obtained by multiplying the value (s), which is determined by differentiating the amount of movement of the piston 5a by time, by the pressure-receiving area A of the hydraulic cylinder 5.

A summing point J6 shows that the flow rate of oil coming in and out of the accumulator 13 is the sum of the flow rate of oil charged or discharged by the operation of the hydraulic cylinder 5 and the flow rate of oil charged or discharged through the flow control valve 9 that operates in response to an instruction from the control unit 12.

In addition, a pressure is produced inside the accumulator 13 in accordance with the flow rate of oil coming in and out of the accumulator 13. More specifically, in an element B1 the value (1/s) that is obtained by temporally integrating the flow rate of oil charged into or discharged from the accumulator 13 represents the amount of oil collected in the accumulator 13, and the value that is obtained by multiplying the integral value (1/s) by the spring constant $K_G$ and dividing the product by the pressure-receiving area A of the hydraulic cylinder 5 represents the force that is generated in the hydraulic cylinder 5. In addition, the element B1 shows that the value that is obtained by dividing the force generated in the hydraulic cylinder 5 by the mass m of the vehicle is equal to the acceleration $\ddot{X}_2$ of the vehicle body. An element B2 shows that the value $(1/s^2)$ that is obtained by integrating the acceleration $\ddot{X}_2$ twice is the displacement $X_2$ of the vehicle body.

The arrow that extends from the output side of the summing point J5 to the element B7 shows that the vehicle level signal $(X_2-X_1)$ is input to the element B7 in the control unit 12. The arrow that extends from the output side of the element B1 to an element B8 shows that the signal $(\alpha_2)$ from the acceleration sensor is input to the element B8.

As will be understood from the block diagram of FIG. 12, according to the suspension system of the first embodiment, the control unit 12 allows oil to be charged into or discharged from the accumulator 13 at a flow rate obtained by amplifying the acceleration signal $\alpha_2$, and the amount of oil in the accumulator 13 varies in accordance with the flow rate of oil charged or discharged to determine the level of force generated in the hydraulic cylinder 5. As a result, the acceleration acting on the vehicle body is fed back as the force applied to the vehicle body, so that the suspension system has excellent vibration-damping characteristics as an active suspension system. In addition, the suspension system also exhibits a superior response because it does not execute a calculation of integrating the acceleration signal.

The control unit 12 also controls the flow rate that is obtained by amplifying the vehicle level signal by the amplification factor K, as described above, such that oil is charged into or discharged from the accumulator 13 at the controlled flow rate. Accordingly, the hydraulic cylinder 5 constantly generates such a force as to cancel a change in the vehicle level. Thus, the suspension system has a level-control function.

Since the amplification factor K is minimized for changes in the vehicle level occurring when the vehicle is running on a normal road surface, as described above, the changes in the vehicle level are lessened by the suspension system. There is, therefore no possibility of changes in a road surface being transmitted directly to the vehicle body to make the attitude thereof unstable. When there are large changes in the vehicle level due to large undulatory irregularities on the road surface, the amplification factor K increases rapidly, as described above, resulting in a rapid increase in the force generated in the hydraulic cylinder 5 to restore the vehicle level to the neutral position. Accordingly, it is possible to almost completely prevent the occurrence of full rebound or full bump, which would otherwise occur when the hydraulic cylinder 5 performs a full-stroke operation.

Figure 4:
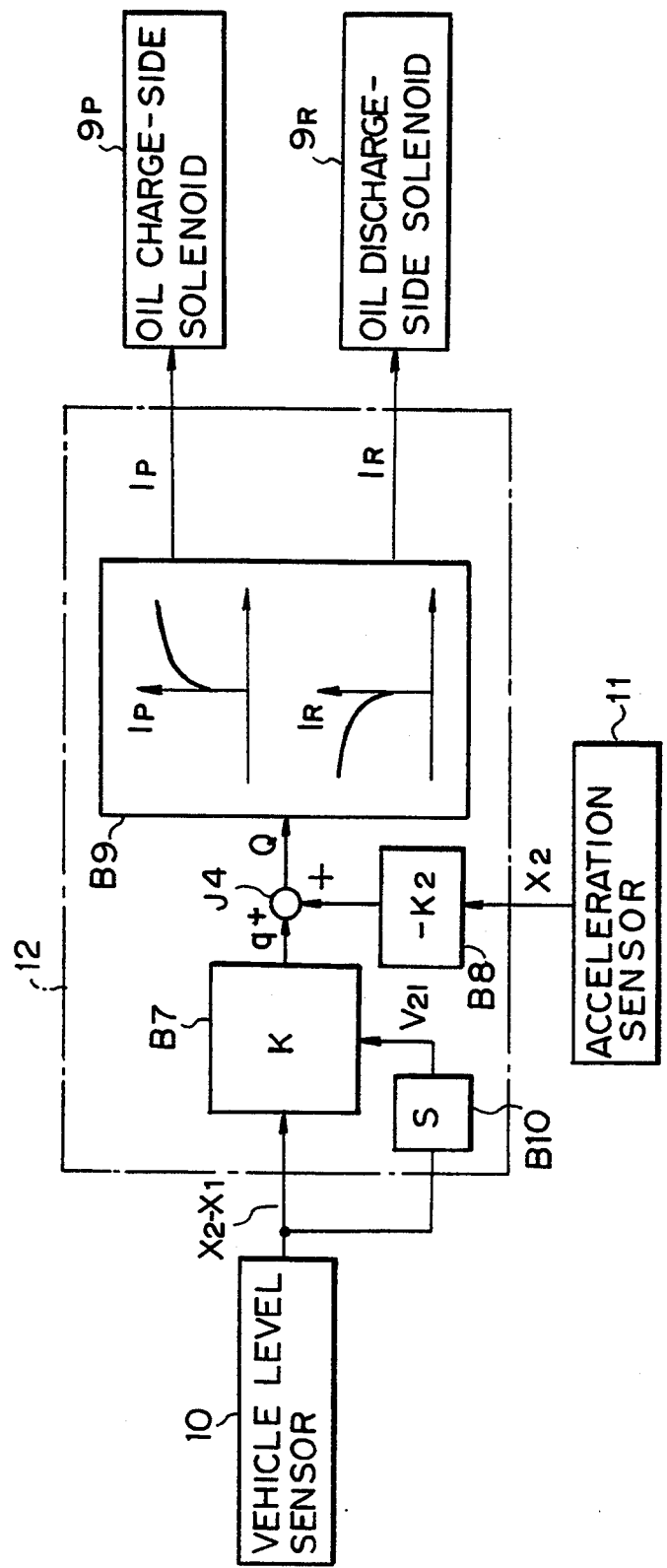
Figure 5:
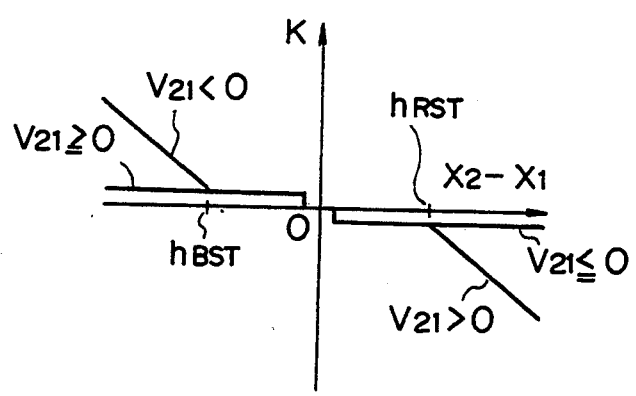
Figure 6:
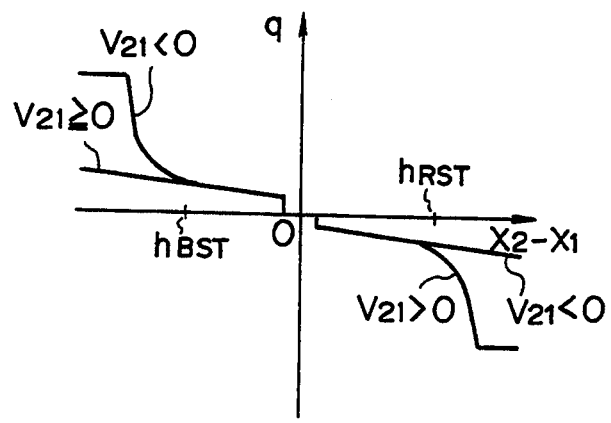

Next, a second embodiment of the suspension system according to the present invention will be explained with reference to FIGS. 4 to 6.

The suspension system of the second embodiment differs from that of the first embodiment in the arrangement of a part of the control unit 12.

More specifically, the amplifier element B7 in the control unit 12 of this suspension system is supplied with a signal detected by the vehicle level sensor 10 and a speed signal $V_{21}$ that is obtained by differentiating the detected signal in a differentiator element B10. The amplifier element B7 multiplies the vehicle level signal $(X_2-X_1)$ by an amplification factor K that changes with the vehicle level signal $(X_2-X_1)$ and the speed signal $V_{21}$ to obtain a flow signal q $(q=K\cdot(X_2-X_1))$ and inputs it to a summing point J4. More specifically, as shown in FIGS. 5 and 6, the amplification factor K is set for each range as follows (i) In the case of $h_{BST}<X_2-X_1<h_{RST}$:
(exclusive of $X_2-X_1=0$)

The amplification factor K is set to a minimal constant value $-k_1$ in the same way as in the first embodiment.

(ii) In the case of $X_2$:

When the speed signal $V_{21} \leq 0$, K is set to $K=-k_1$, whereas, when the speed signal $V_{21}>0$, K is set, for example, to $K=-k_1\cdot(X_2-X_1)/h_{RST}$, so that the flow signal q lowers in a higher-order functional manner in accordance with the increase in the vehicle level $(_2-X_1)$.

(iii) In the case of $X_2-X_1 \geq h_{BST}$:

When the speed signal $V_{21} \geq 0$, K is set to $K=-k_1$, whereas, when the speed signal $V_{21}<0$, K is set, for example, to $K=k_1\cdot(X_2-X_1)/h_{BST}$, so that the flow signal q rises in a higher-order functional manner in accordance with the decrease in the vehicle level $(X_2-X_1)$.

The signal transfer in the suspension system of the second embodiment may be expressed by a block diagram that is formed by adding the differentiator element B10 to the block diagram of FIG. 12. Thus, the operation of this suspension system is substantially the same as that of the first embodiment but it is different from the latter in the level-control function for large changes in the vehicle level.

More specifically, even when the range of normal level changes is exceeded (in the case of (ii) or (iii)), unless the change in the vehicle level at that point of time is progressing toward the end of the stroke of the hydraulic cylinder 5, the amplification factor K is set to a minimal constant value $-k_1$, so that the operation of restoring the vehicle level to the neutral position is effected gradually.

Accordingly, in a case where the vehicle level exceeds a normal value and hence, the hydraulic cylinder 5 is in a position close to an end of its stroke but the vehicle body is returning to the neutral position (that is, in such a case, there is no probability of full rebound or full bump), it is possible to avoid the problem of an increase in the amplification factor K causing the vehicle body to become unstable.

Thus, the suspension system of the second embodiment has the advantages that there is little probability of an occurrence of full rebound or full bump as in the suspension system of the first embodiment, and that the attitude of the vehicle body can be maintained stably over a wider range than in the first embodiment.

Next, a third embodiment of the suspension system of the present invention will be explained with reference to FIGS. 7 to 10.

The suspension system of the third embodiment also differs from that of the first embodiment in the arrangement of the element B7 in the control unit 12.

Figure 7:
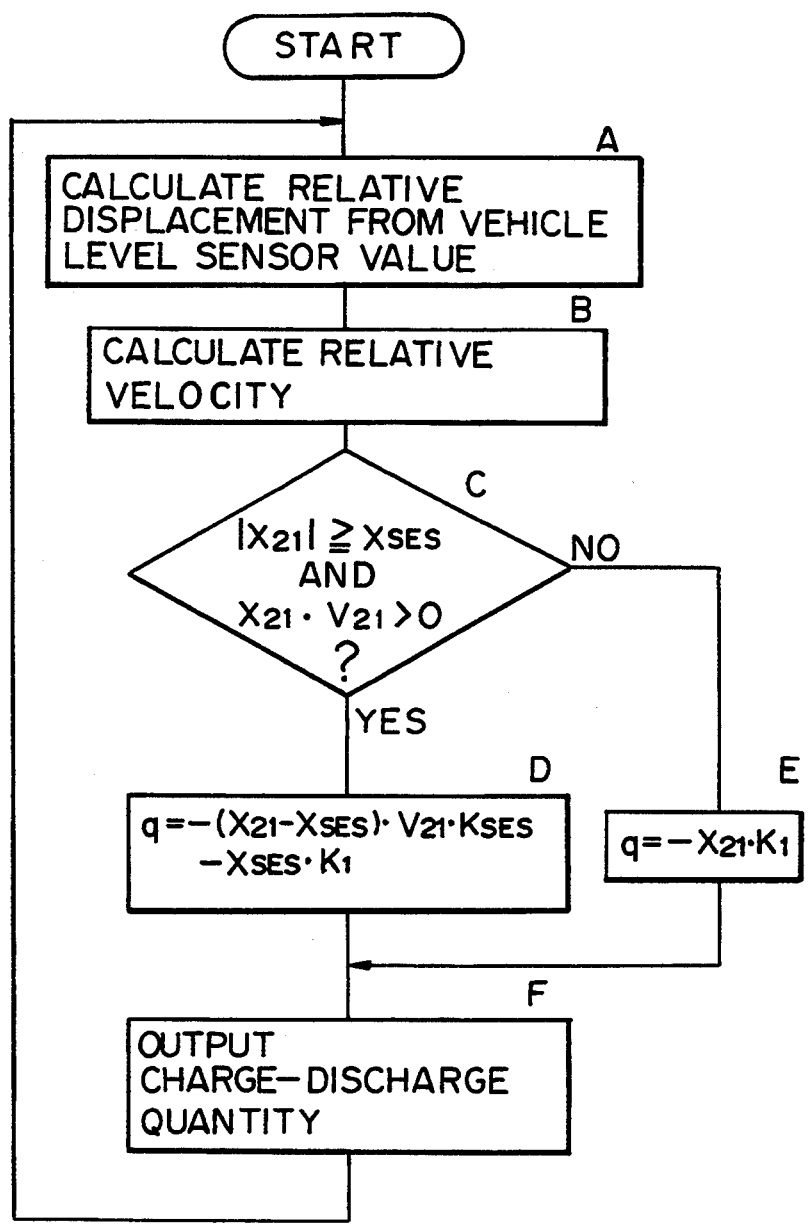

More specifically, the element B7 in the control unit 12 of this suspension system operates as shown in the 25 flowchart of FIG. 7 to input a flow signal q to the summing point J4. The flowchart will be explained below for each step.

[Step A and Step B]

A speed $V_{21}$ of the vehicle body is obtained from a vehicle level signal $(X_2-X_1=X_{21})$, and the process then proceeds to Step C.

[Step C]

At step C, it is judged whether or not the vehicle is presently in a state where the hydraulic cylinder 5 is likely to perform a full-stroke operation (i.e., full rebound or full bump is likely to occur). More specifically, if $|X_{21}| \geq X_{SES}$ and $X_{21}\cdot V_{21} \geq 0$, it is judged that the hydraulic cylinder 5 is likely to perform a full-stroke operation because the vehicle level $X_{21}$ is close to a position corresponding to an end of the stroke and the hydraulic cylinder 5 is being displaced toward the stroke end, and the process then proceeds to Step D. If NO is the answer at Step C, the process proceeds to Step E.

Here, $X_{SES}$ is equal to the respective absolute values of the normal maximum level $h_{RST}$ and the normal minimum level $h_{BST}$ when set to be equal to each other, that is, $h_{RST}=X_{SES}$ and $h_{BST}=-X_{SES}$.

[Step D]

The following equation is calculated, and the process then proceeds to Step F:

$$q = -(X_{21}-X_{SES}) \cdot V_{21} \cdot K_{SES} - X_{SES} \cdot K_1$$

In the above equation, the value of $-(X_{21}-X_{SES}) \cdot V_{21} \cdot K_{SES}$ is used to obtain a degree of likelihood of a full-stroke operation, and a flow signal q is calculated on the basis of this value. At this time, $-X_{SES} \cdot K_1$ is added thereto in order to give a feeling of continuity in the normal relative displacement feedback.

Figure 8:
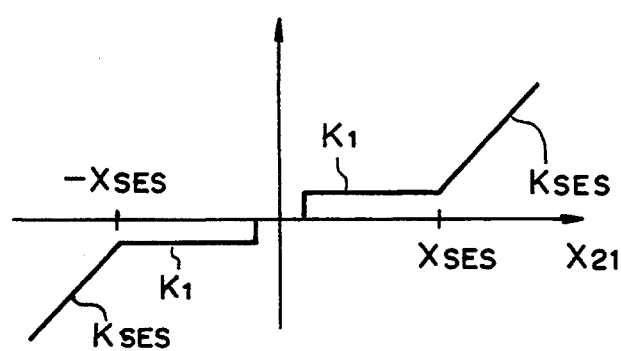
Figure 9:
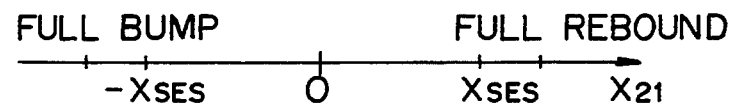

In addition, $K_{SES}$ is an amplification factor that increases with $X_{21}$, as shown in FIG. 8. The amplification factor $K_{SES}$ is set, for example, as given from the following expression in the same way as in the foregoing embodiment:

$$K_{SES}=k_1 \cdot X_{21}/X_{SES}$$

[Step E]

The following equation is executed, and the process then proceeds to Step F:

$$q=-X_{21} \cdot K_1$$

[Step F]

The flow signal q obtained by the calculation at Step D or Step E is output to the summing point J4.

The operation of the suspension system of the third embodiment is substantially the same as those of the first and second embodiments but it is different therefrom in the level-control function for large changes in the vehicle level. More specifically, as will be clear from the above-described flowchart, particularly Step D, when there is a change in the vehicle level toward a stroke end of the hydraulic cylinder 5, a controlled variable that is proportional to the speed $V_{21}$ is employed to restore the vehicle level to the neutral position.

Accordingly, unlike the first and second embodiments in which full rebound or full bump cannot be avoided when the vehicle level changes at a high speed, the third embodiment can prevent full rebound or full bump even if the vehicle body speed is high.

Figure 10A:
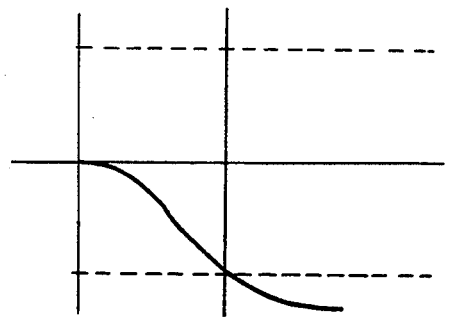
FIG. 10(a) is a graph showing changes of a road surface.
Figure 10B:
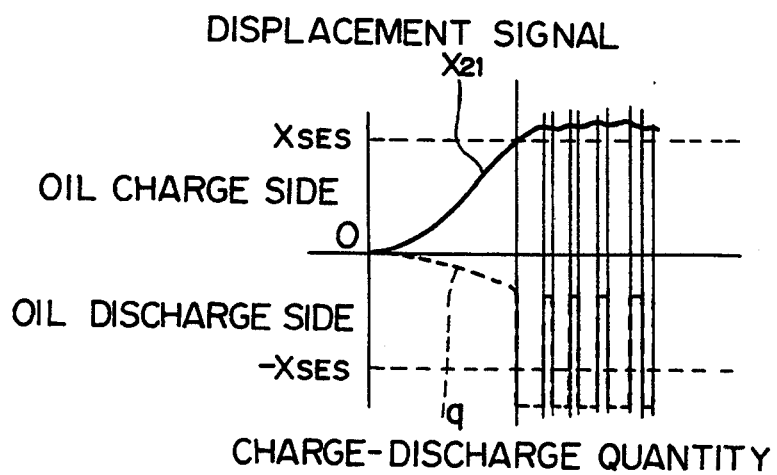
FIGS. 10(b) and 10(c) are graphs each showing changes of a vehicle level signal and a controlled variable in accordance with changes in the road surface shown in FIG. 10(a).
Figure 10C:
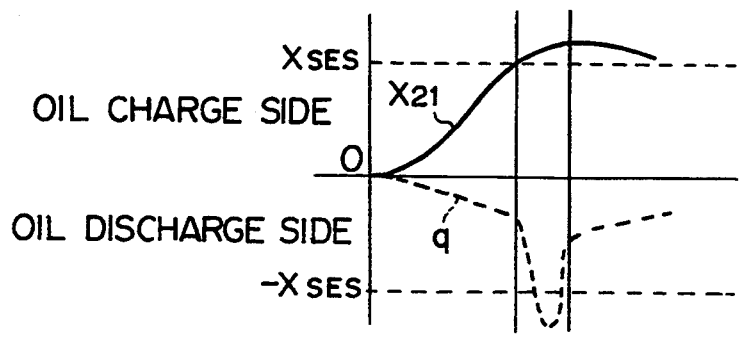

For example, when there is a road surface change such as that shown in FIG. 10(a), according to the suspension system of the second embodiment the flow signal q varies as shown in FIG. 10(b) due to the inversion of the sign of the speed $V_{21}$, whereas, according to the suspension system of the third embodiment the amplification factor is controlled in accordance with the vehicle body speed and therefore the flow signal q varies smoothly as shown in FIG. 10(c), thus preventing full rebound or the like.

Accordingly, the suspension system of the third embodiment has the great advantage that it is possible to prevent full rebound or full bump even more effectively and reliably and that there is no probability that the preventive operation will cause the vehicle body to become unstable.

Figure 11:
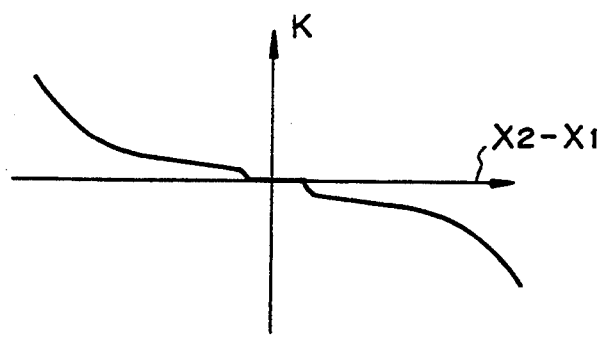
FIG. 11 is a graph showing the relationship between the vehicle level and an amplification factor for supplementary explanation of the present invention.

Although in the foregoing three embodiments the amplification factor K is increased using a predetermined value (i.e., the normal maximum level $h_{RST}$ or the like) of the vehicle level $(X_2-X_1)$ as a reference value in order to prevent full rebound or full bump, it should be noted that the amplification factor K may be increased along a curve which may be expressed by a single higher-order functional equation, as shown exemplarily in FIG. 11.

In addition, the present invention is not necessarily limited to a suspension system of the type in which the acceleration $a_2$ acting on the vehicle body is fed back, as in the foregoing embodiments, but it is applicable to any type of suspension system which needs to respond to a change in the vehicle level by restoring the level to the neutral position on the basis of the vehicle level signal. In such a case also, the same advantages as those described above are obtained.

Figure 13:
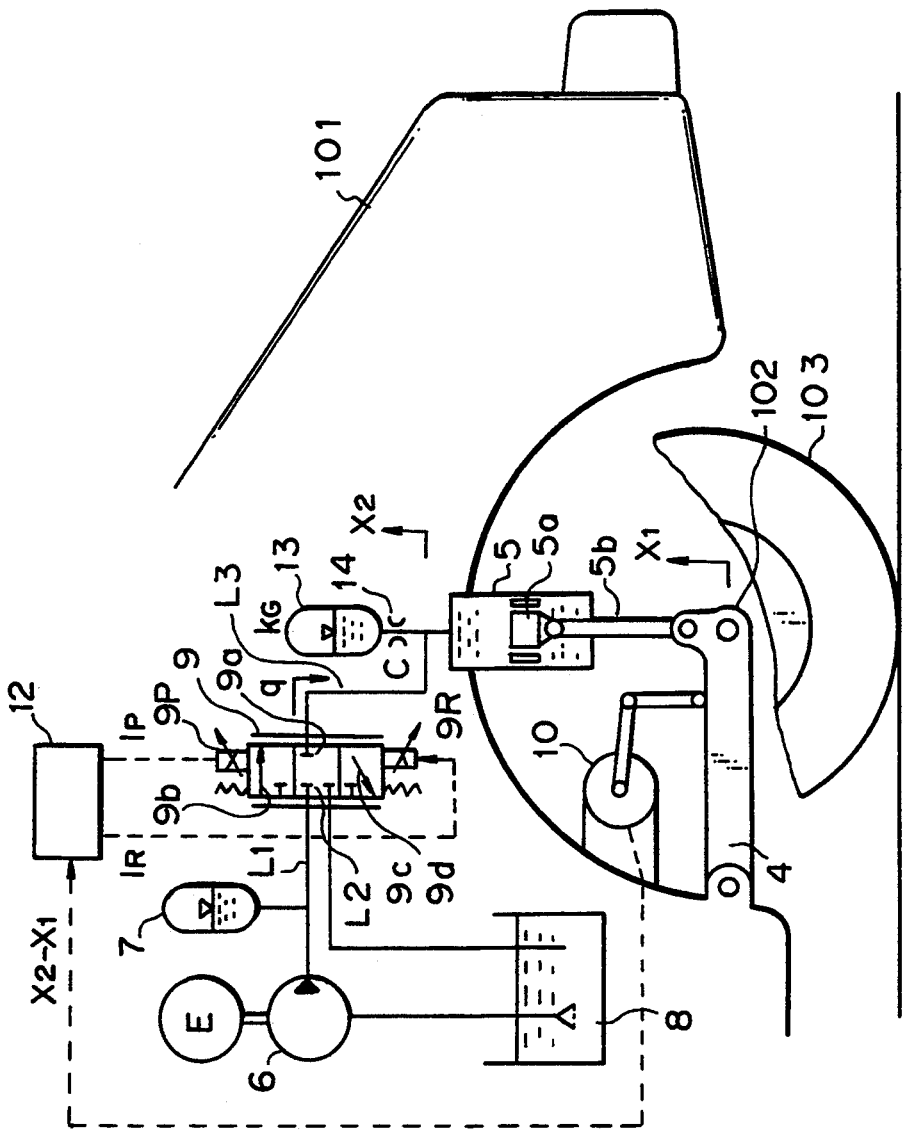
FIG. 13 is a schematic diagram of a fourth embodiment of the suspension system according to the present invention.

Next, a fourth embodiment of the present invention will be described below with reference to FIGS. 13 to 17, in which the same members as those in the first embodiment are denoted by the same reference numerals. FIG. 13 is a schematic diagram showing the general arrangement of the fourth embodiment of the suspension system for a-vehicle according to the present invention. In this figure, reference numeral 1 denotes a vehicle body, 2 an axle, 3 a tire, and 4 an arm that is pivotally supported at one end thereof by the vehicle body 1 and at the other end by the axle 2. The vehicle body 1, the axle 2, the tire 3, and the arm 4 each constitute a part of a vehicle.

The suspension system mounted on the vehicle shown in FIG. 13 is arranged as follows. A hydraulic cylinder 5 is provided on the axle 2 to support the vehicle body 1. The hydraulic cylinder 5 extends and retracts in accordance with the relative vertical displacement $(X_2-X_1)$ between the vehicle body 1 and the axle 2 (the displacement being hereinafter referred to as "vehicle level"), so that oil flows in and out of the cylinder 5 through piping L3 in accordance with the extension and retraction of the hydraulic cylinder 5. In the figure, $X_1$ and $X_2$ represent respective displacements of the axle 2 and the vehicle body 1 from a reference point in the vertical direction. The hydraulic cylinder 5 has a piston 5a fitted therein to define oil chambers on both sides thereof, which communicate with each other through a through-hole that is formed in the piston 5a. The pressure-receiving area of the hydraulic cylinder 5 is equal to the cross-sectional area of a rod 5b that is connected to the piston 5a.

Reference numeral 6 denotes a hydraulic pump having an engine E as a drive source, 7 an accumulator containing a gas to function as a gas spring, and 8 a reservoir tank for storing oil. The hydraulic pump 6, the accumulator 7 and the reservoir tank 8 constitute in combination a hydraulic system (hydraulic power source). A control valve, for example, a flow control valve 9 controls the flow rate of oil charged into and discharged from the hydraulic cylinder 5. The flow control valve 9 is connected to the hydraulic pump 6 through piping L1, to the reservoir tank 8 through piping L2, and to the hydraulic cylinder 5 through the piping L3.

In addition, an accumulator 13 containing a gas is provided at an intermediate point in the piping L3 connecting the hydraulic cylinder 5 and the flow control valve 9. Further, a restrictor 14 is provided inbetween the intermediate point, to the piping L3 and and the accumulator 13. The restrictor 14 offers piping resistance (damping force) for suppressing free oscillation when the flow control valve 9 ceases operation. Reference numeral 10 denotes a vehicle level sensor that detects a vehicle level ($X_2-X_1$), and 12 a control unit that is supplied with a vehicle level signal ($X_2-X_1$) from the vehicle level sensor 10 to control on the basis of the input signal the amount of movement of each of the oil charge-and discharge-side solenoids 9P and 9R of the flow control valve 9 (described later), that is, the charge-discharge quantity.

The flow control valve 9 will next be described in detail. The flow control valve 9 comprises two solenoids (oil charge-side solenoid 9P and oil discharge-side solenoid 9R), an input-output port 9a, and three ports, that is, an oil charge port 9b, a hold port 9c, and an oil discharge port 9d, which are selectively connected to the input-output port 9a by the switching operation of the solenoids 9P and 9R. The input-output port 9a is connected to the piping L3.

The arrangement is such that if a current $I_P$ is supplied to the oil charge-side solenoid 9P from the control unit 12, the oil charge port 9b and the input-output port 9a are, placed in communication with each other, and the hydraulic pump 6 is activated to charge oil into the hydraulic cylinder 5 and the accumulator 18 from the reservoir tank 8, so that pressure is generated in the hydraulic cylinder 5. On the other hand, if a current $I_R$ is supplied to the oil discharge-side solenoid 9R from the control unit 12, the oil discharge port 9d and the input-output port 9a are communication with each other, so that the oil is discharged from the hydraulic cylinder 5 and the accumulator 13 to the reservoir tank 8, resulting in a reduction in the pressure.

Figure 14:
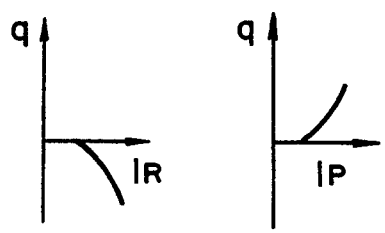
FIG. 14 is a graph showing characteristics of a flow control valve shown in FIG. 13.

It should be noted that, when the control unit 12 supplies no current to the oil charge-side solenoid 9P and the oil discharge-side solenoid 9R, the hold port 9c and the input-output port 9a communicate with each other, thereby suspending the charge-discharge operation, and thus maintaining the oil pressure inside the hydraulic cylinder 5. The flow control valve 9 is arranged such that the absolute value of the charge-discharge quantity Q increases unvaryingly with the current values $I_P$ and $I_R$ according to predetermined functional conditions, as shown in FIG. 14.

Figure 15:
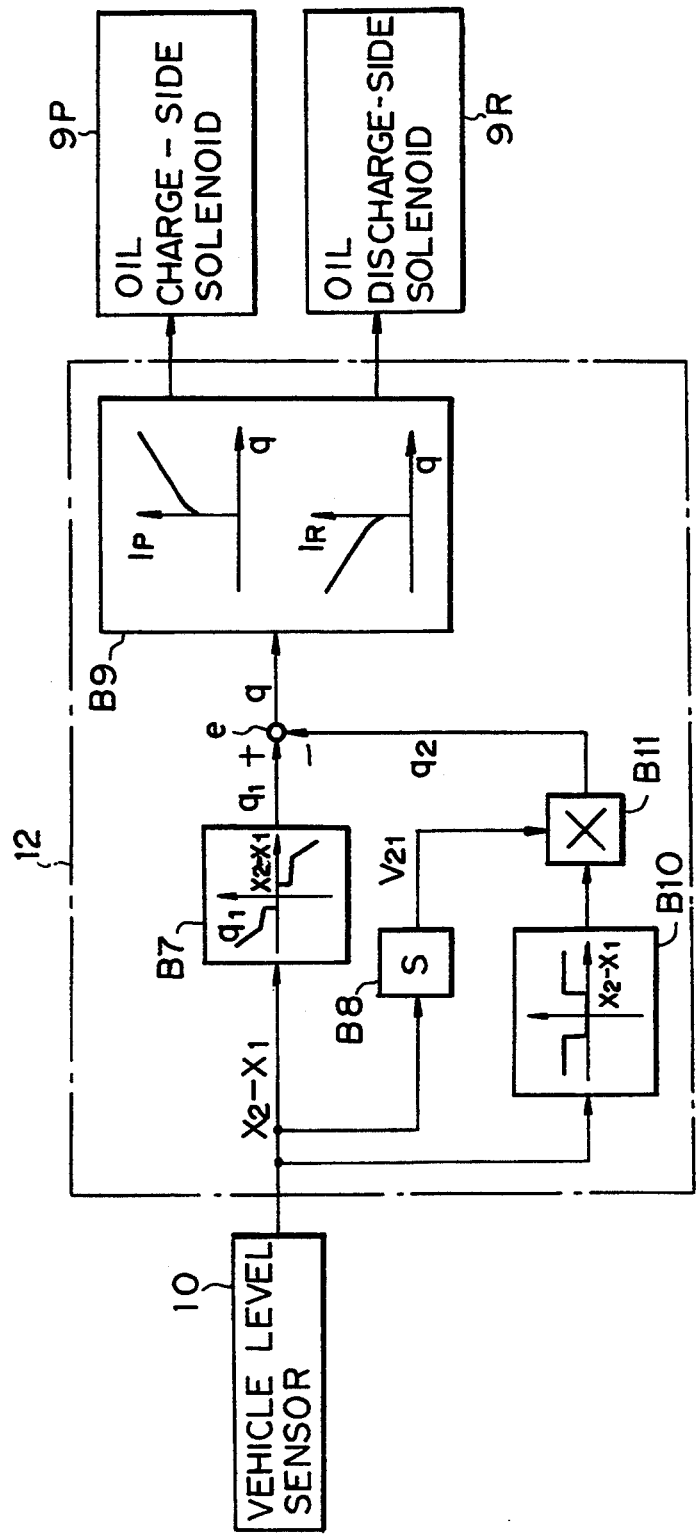
FIG. 15 is a block diagram of a control unit shown in FIG. 13.

Next, the arrangement and function of the control unit 12 will be explained with reference to FIG. 15, which is a block diagram showing the arrangement and function of the control unit 12. In this figure, the vehicle level sensor 10 supplies a vehicle level signal ($X_2-X_1$) to the control unit 12.

When the control unit 12 is supplied with the vehicle level signal ($X_2-X_1$), the signal ($X_2-X_1$) is multiplied by a vehicle level control amplification factor $K_1$ (detailed later) in an amplifier element B7 to output a vehicle level control variable $q_1$ ($q_1=K_1\cdot((X_2-X_1))$). In addition, the vehicle level signal ($X_2-X_1$) is differentiated in a differentiator element B8 to output a vehicle level speed signal $V_{21}$, and the vehicle level signal ($X_2-X_1$) is also input to an element B10 to output a speed control amplification factor $K_2$ (detailed later) in accordance with the input signal. The output $V_{21}$ from the differentiator element B8 and the output $K_2$ from the element B10 are multiplied together in a multiplier element B11 to obtain a speed control variable $q_2$, which is added to the vehicle level control variable $q_1$ at a summing point e.

The flow signal q ($q=q_1-q_2$) obtained by the summation is then input to a transfer element B9 where inverse transformation of flow control valve characteristics is executed so that the flow rate controlled by the flow control valve 9 coincides with the value of the flow signal q, and the control unit 12 supplies a current to either the oil charge-side solenoid 9P or the oil discharge-side solenoid 9R. More specifically, when the flow signal q is positive, the control unit 12 supplies the current $I_P$ corresponding to the flow rate q to the oil charge-side solenoid 9P, whereas, when the flow signal q, is negative, the control unit 12 supplies the current $I_R$ corresponding to the flow rate q to the oil discharge-side solenoid 9R.

Figure 16:
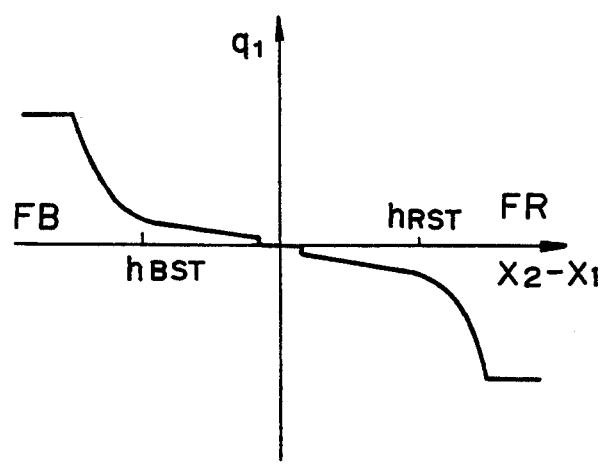
FIG. 16 is a graph showing the relationship between the vehicle body-axle distance and a vehicle level control variable.

As shown in FIG. 16, the vehicle level control amplification factor $K_1$ is set for each range as follows:

(1) In the case of $h_{BST}<X_2-X_1<h_{RST}$.
(exclusive of $X_2-X_1\approx 0$)

This condition applies in a case where the vehicle is running on a normal road surface, that is, the vehicle level ($X_2-X_1$) is somewhere between a normal maximum level $h_{RST}$ at which the hydraulic cylinder 5 extends as far as a position a little short of the end of the full extension stroke and a normal minimum level $h_{BST}$ at which the hydraulic cylinder 5 retracts as far as a position a little short of the end of the full retraction stroke. In this case, $K_1$ is set to a predetermined value $-k_{10}$ ($k_{10}>0$), which is minimized to such an extent that it will not interfere with the function of the suspension system to restore the vehicle level to a neutral position (i.e., a position where $X_2-X_1=0$)

(2) In the case of $X_2-X_1 \geq h_{RST}$:

This condition applies in a case where the hydraulic cylinder 5 extends beyond the position corresponding to the normal maximum level $h_{RST}$. In such a case, $K_1$ is set, for example, to $K_1=k_{10}\cdot(X_2-X_1)/h_{RST}$, so that the vehicle level control variable $q_1$ lowers in a higher-order functional manner in accordance with the increase in the vehicle level ($X_2-X_1$).

(3) In the case of $X_2-X_1 \leq h_{BST}$:

This condition applies in a case where the hydraulic cylinder 5 retracts beyond the position corresponding to the normal minimum level $h_{BST}$. In such a case, $K_1$ is set, for example, to $K_1=k_{10}\cdot(X_2-X_1)/h_{BST}$, so that the vehicle level control variable $q_1$ rises in a higher-order functional manner in accordance with the decrease in the vehicle level ($X_2-X_1$).

Figure 17:
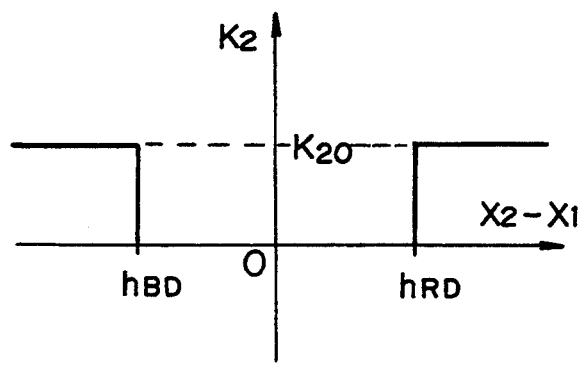
FIG. 17 is a graph showing the relationship between the vehicle body-axle distance and a speed control amplification factor.

As shown in FIG. 17, the speed control amplification factor $K_2$ is set for each range as follows:

(4) In the case of $h_{BD}<X_2-X_1<h_{RD}$:

This condition applies in a case where the vehicle is running on a normal road surface, that is, the vehicle level ($X_2-X_1$) is within a predetermined range including the neutral position. In this case, $K_2$ is set to a predetermined value, that is, $K_2=0$. It should be noted that $h_{BST}$ and $h_{RD}$ are herein set such that $h_{BST}<h_{BD}$ and $h_{RD}<h_{RST}$.

(5) In the case of $X_2-X_1 \leq h_{BD}$ or $X_2-X_1 \geq h_{RD}$:

This condition applies in a case where the hydraulic cylinder 5 extends or retracts away from the vicinity of the neutral position. In such a case, $K_2$ is set to a predetermined value $k_2$ larger than the predetermined value 0 (i.e., $k_2>0$).

According to the suspension system of the fourth embodiment, arranged as described above, when the vehicle level changes to such an extent that the hydraulic cylinder 5 arrives at a position close to an end of its stroke, the control unit increases the vehicle level control amplification factor $K_1$ and sets the speed control amplification factor $K_2$ to a relatively large value $K_{20}$, resulting in a rapid Increase of the absolute value of the flow signal q. Accordingly, the force derived from the hydraulic cylinder 5 to restore the vehicle level to the neutral position Increases rapidly, thus making it possible to prevent the occurrence of full rebound or full bump, which would otherwise occur when the hydraulic cylinder performs a full-stroke operation.

In other words, the suspension system of the fourth embodiment feedback-controls the distance between the vehicle body and the axle such that, the greater the deviation of the distance from the neutral state, the greater the force that is generated to restore it to the neutral state, and also reduces the relative velocity between the vehicle body and the axle (i.e., increases the suspension damping coefficients) by feedback control. Thus, full rebound or full bump can be prevented extremely effectively and reliably.

Moreover, when the distance between the vehicle body and the axle is in the vicinity of the neutral state (i.e., during running on a normal road surface), the speed control amplification factor $K_2$ is set to 0, so that the speed feedback control is suspended, and the vehicle level control amplification factor $K_1$ is increased only in a range where the hydraulic cylinder is at a position close to an end of its stroke. Thus, despite the existence of speed feedback, which is likely to make a vehicle uncomfortable to ride in, it is possible to ensure a good vehicle ride when running on a normal road surface by maintaining the suspension damping coefficient at a low level and thereby gradually performing the operation of responding to change in the vehicle level by restoring it to a neutral position.

More specifically, changes in the vehicle level occurring when the vehicle is running on a normal road surface are lessened by the suspension system, and there Is therefore no probability that engages of the road surface are transmitted directly to the vehicle body to make the attitude thereof unstable. When there are large changes In the vehicle level due to large undulatory irregularities on the road surface, the flow signal q increases rapidly, as described above, resulting in a rapid increase in the force generated in the hydraulic cylinder 5 to restore the vehicle level to the neutral position. Accordingly, it is possible to almost completely prevent the occurrence of full rebound or full bump, which would otherwise occur when the hydraulic cylinder 5 performs a full-stroke operation.

Figure 18:
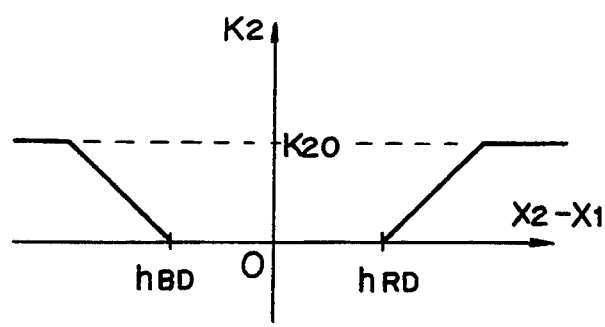
FIG. 18 is a graph showing the relationship between the vehicle body-axle distance and the speed control amplification factor.
Figure 19:
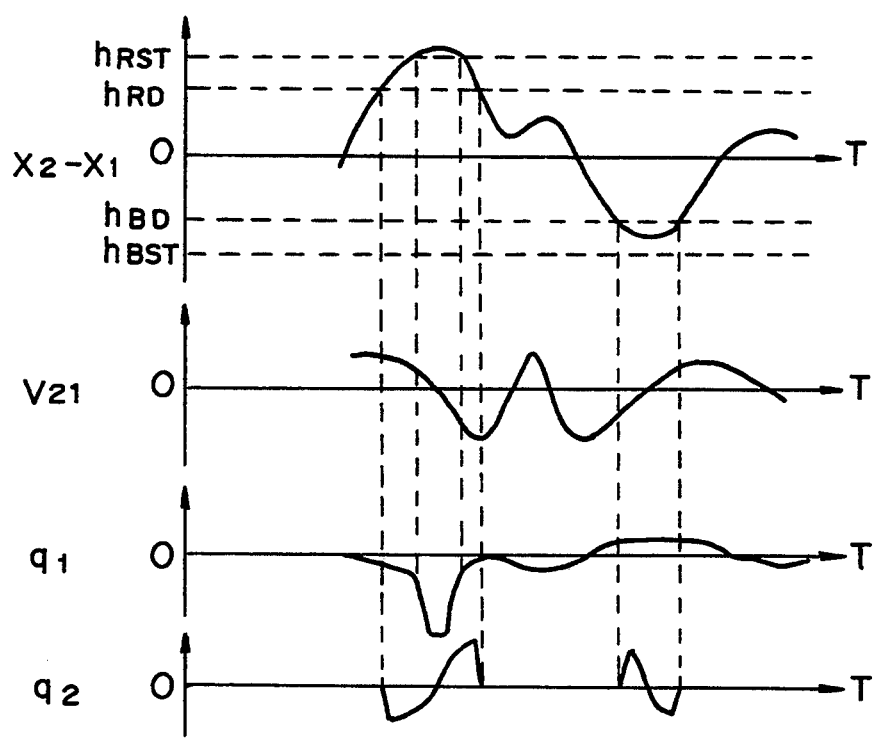
FIG. 19 shows time-series data of the vehicle body-axle distance, the relative velocity of the vehicle body, the vehicle level control variable and the speed control variable.
Figure 20:
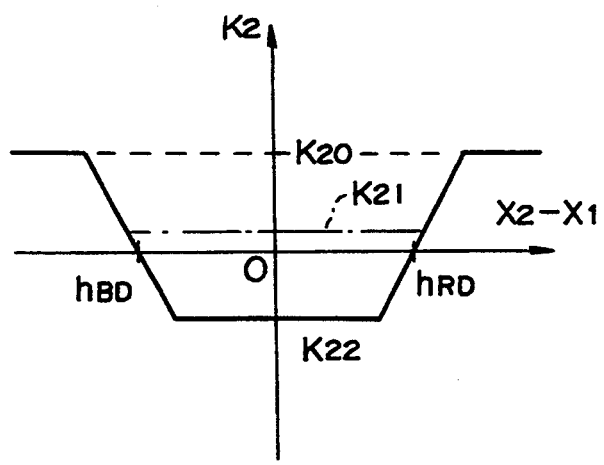
FIG. 20 is a graph showing the relationship between the vehicle body-axle distance and the speed control amplification factor.

It is better for the speed control amplification factor $K_2$ to be set so as to change smoothly at $(X_2-X_1)=h_{BD}$, $h_{RD}$, as shown in FIG. 18. FIG. 19 shows time-series data of the relative velocity $V_{21}$ in the vertical direction of the vehicle body, the vehicle level control variable $q_1$ and the speed control variable $q_2$ in this case. It will be understood from the figure that the speed control variable $q_2$ rises gradually and there is therefore no discontinuity of control. It is also possible to set the speed control amplification factor $K_2$ to a positive small value $K_{21}$ (shown by the one-dot chain line) in the range of $h_{BD}<X_2-X_1<h_{RD}$ to thereby reduce the speed feedback control variable. If the speed control amplification factor $K_2$ is set to a negative value $K_{22}$ ($K_{22}<0$) in inverse relation to the above, it is possible to make the vehicle even more comfortable to ride in.

Figure 21:
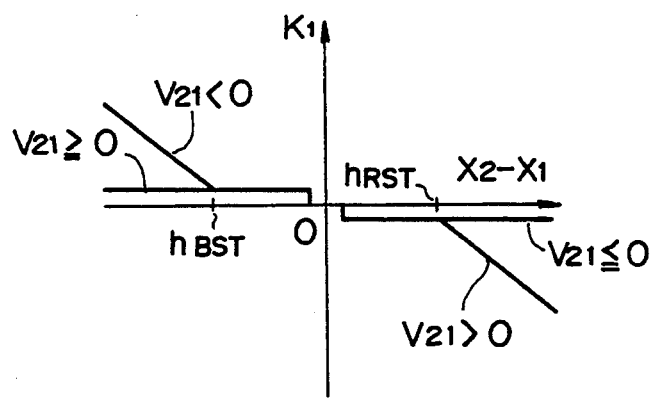
FIG. 21 is a graph showing the relationship between the vehicle body-axle distance and a vehicle level control amplification factor.
Figure 22:
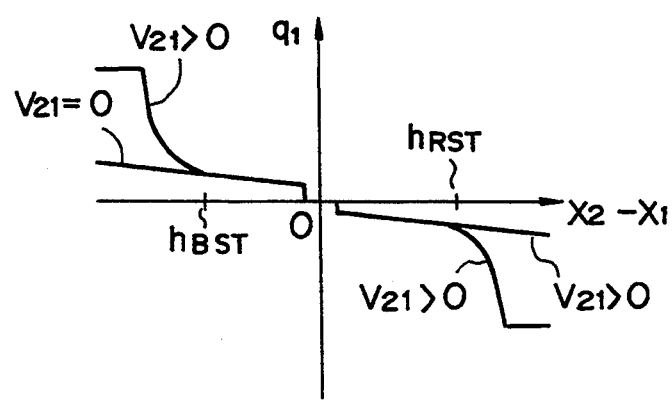
FIG. 22 is a graph showing the relationship between the vehicle body-axle distance and the vehicle level control variable.

It is also possible to change over the vehicle level control amplification factor $K_1$ from one value to another in regions other than a predetermined one ($h_{BST}<X_2-X_1<h_{RST}$) according to whether the vehicle level speed signal $V_{21}$ is positive or negative, as shown in FIGS. 21 and 22. More specifically, the vehicle level control amplification factor $K_1$ may be set for each range as follows.

(4) In the case of $h_{BST}<X_2-X_1<h_{RST}$:
(exclusive of $X_2-X_1=0$)
In this case, $K_1$ is set to a minimal constant value $-k_{10}$ ($k_{10}>0$).

(5) In the case of $X_2-X_1 \geq h_{RST}$:
When the speed signal $V_{21} \leq 0$, $K_1$ is set to $K_1 = -k_{10}$, whereas, when the speed signal $V_{21}>0$, $K_1$ is set, for example, to $K_1 = -k_{10} \cdot (X_2-X_1)/h_{RST}$, so that the vehicle level control variable $q_1$ lowers in a higher-order functional manner in accordance with the increase in the vehicle level $(X_2-X_1)$.

(6) In the case of $X_2-X_1 \leq h_{BST}$:
When the speed signal $V_{21} \geq 0$, $K_1$ is set to $K_1 = -k_{10}$, whereas, when the speed signal $V_{21} \geq 0$, $K_1$ is set, for example, to $K_1 = k_{10} \cdot (X_2-X_1)/h_{BST}$, so that the vehicle level control variable $q_1$ rises in a higher-order functional manner in accordance with the decrease in the vehicle level $(X_2-X_1)$.

Thus, even when a normal range of changes in the vehicle level is exceeded, unless the change in the vehicle level at that point of time is progressing toward an end of the stroke of the hydraulic cylinder 5, the amplification factor K is set to a minimal constant value $-k_{10}$, so that the operation of restoring the vehicle level to the neutral position is effected gradually. Accordingly, it is possible to make the vehicle comfortable to ride in over a wider range.

In this case, it is necessary to input the vehicle level speed signal $V_{21}$ to the amplifier element B7, and for example, the output of the differentiator element B8 may be branched so as to be input thereto.

According to the suspension system of the present invention, it is possible to prevent full rebound and full bump extremely effectively and reliably, and with regard to changes in the vehicle level occurring when the vehicle is running on a normal road surface, the operation of restoring the vehicle level to the neutral portion is effected gradually, so that there is no possibility of changes in a road surface being transmitted directly to the vehicle body and thus making the vehicle uncomfortable to ride in.

Although, in the embodiments described above, a flow control valve is employed to control the flow rate of oil charged into and discharged from the accumulator and hydraulic cylinder, it is to be noted that the present invention is not limited thereto. For example, a pressure control valve may be employed in place of a flow control valve to control the oil charging into and discharging from the accumulator and hydraulic cylinder. In that case, the pressure control valve functions to control the pressure which is supplied to the accumulator and hydraulic cylinder on the basis of a pressure control signal instead of a flow control signal.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A suspension system of a vehicle, said system comprising:

a hydraulic cylinder connected to a body and an axle of the vehicle so as to extend and retract as the distance between the body and the axle of the vehicle changes, said hydraulic cylinder having preestablished full extension and retraction strokes, and a neutral position, and said hydraulic cylinder including a cylinder in which a working chamber is defined, the volume of said working chamber varying during the extension and retraction of the hydraulic cylinder;

an accumulator containing a gas, said accumulator communicating with said working chamber;

a pressurized oil supply;

a control valve operatively hydraulically interposed between said pressurized oil supply and said hydraulic cylinder so as to control the flow of oil into and from said working chamber;

a vehicle level sensor which detects changes in said distance between the body and the axle of the vehicle and issues a respective signal representative of each of said changes; and a control unit, operatively connected to said vehicle level sensor and said control valve, which receives each said signal issued by the vehicle level sensor, and issues a control signal to said control valve that operates said control valve to cause a force to be generated that restores said hydraulic cylinder to said neutral position, which said control unit can generate a first control signal by executing an operation in which the signal issued by the vehicle level sensor is multiplied by a first vehicle level control amplification factor at the time said signal issued by the vehicle level sensor is indicative of the hydraulic cylinder being located anywhere between said neutral position and the full extension or the full retraction stroke thereof, respectively, and which said control unit can generate a second control signal by executing an operation in which the signal issued by the vehicle level sensor is multiplied by a second vehicle level control amplification factor at the time said signal issued by the vehicle level sensor is indicative of the hydraulic cylinder being at a location between said position short of the full extension or the full retraction stroke there and the associated full extension or retraction stroke, which said control unit selectively generates said first and said second control signals and issues the control signal so generated to said control valve as said control signal that operates the control valve, said first and said second vehicle level control amplification factors being different wherein the force generated to restore the hydraulic cylinder to said neutral position is larger when said second control signal is generated than when said first control signal is generated, which said control unit generates said second control signal only when the hydraulic cylinder is progressing from said position just short of the full extension or full retraction stroke thereof towards the associated full extension or full retraction stroke, respectively, and which said control unit generates said first control signal when the hydraulic cylinder is progressing from the full extension stroke or the full retraction stroke thereof towards said position just short of the full extension or full retraction stroke, respectively.

2. A suspension system of a vehicle as claimed in claim 1, wherein said control unit selectively generates said first and said second control signals on the basis of the speed at which the hydraulic cylinder is extending or retracting, and generates said second control signal only when said speed is greater than a predetermined value.

3. A suspension system of a vehicle as claimed in claim 1, wherein said control unit issues said control signal to operate said control valve to cause a force to be generated which includes a component that tends to extend or retract said hydraulic cylinder to said neutral position and a component that tends to reduce the relative velocity between the body and the axle of the vehicle, and which said control unit generates said control signal by summing (a) a vehicle level control variable which is the product of a value of the signal from said vehicle level sensor and said vehicle level control amplification factor and (b) a speed control variable which is the product of a speed amplification factor and a differentiated value that is the mathematical derivative of the signals from the vehicle level sensor, which said control unit establishes said speed control amplification factor at a value not larger than a predetermined value when the value of the signal from said level sensor is within a predetermined range including a value corresponding to a signal indicative of the hydraulic cylinder being in said neutral position, and which said control unit establishes said speed control amplification factor at a value larger than said predetermined value when the value of the signal from said level sensor is outside of said predetermined range.

* * * * *

UNITED STATES PATENT AND TRADEMARK OFFICE
CERTIFICATE OF CORRECTION

PATENT NO. : 5,384,706
DATED : January 24, 1995
INVENTOR(S) : Masaaki UCHIYAMA et al.

It is certified that error appears in the above-indentified patent and that said Letters Patent is hereby corrected as shown below:

On the Abstract page, under the Foreign Application Priority Data of item [30], "November 30, 1991" has been changed to "November 30, 1990".

Signed and Sealed this

First Day of August, 1995

*Attest:*

BRUCE LEHMAN

*Attesting Officer*   *Commissioner of Patents and Trademarks*